US010660471B2

(12) United States Patent
Kim et al.

(10) Patent No.: US 10,660,471 B2
(45) Date of Patent: May 26, 2020

(54) COOKING APPLIANCE

(71) Applicant: Samsung Electronics Co., Ltd., Gyeonggi-do (KR)

(72) Inventors: Tae-Hun Kim, Seongnam-si (KR); Jong-Hoon Lee, Suwon-si (KR); Kun-Woo Choi, Yongin-si (KR); Seo Kang Kim, Suwon-si (KR); Woo Joo Kim, Suwon-si (KR); In Ki Jeon, Hwaseong-si (KR); Seong Joo Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 15/858,806

(22) Filed: Dec. 29, 2017

(65) Prior Publication Data

US 2018/0184843 A1 Jul. 5, 2018

(30) Foreign Application Priority Data

Jan. 3, 2017 (KR) .................... 10-2017-0000965

(51) Int. Cl.
*F24C 15/00* (2006.01)
*F24C 15/02* (2006.01)
(Continued)

(52) U.S. Cl.
CPC ............ *A47J 37/0641* (2013.01); *A21B 1/24* (2013.01); *A47J 27/12* (2013.01); *F24C 15/006* (2013.01);
(Continued)

(58) Field of Classification Search
CPC ..... A47J 37/0641; A47J 27/12; F24C 15/006; F24C 15/00; F24C 15/02; F24C 15/32;
(Continued)

(56) References Cited

U.S. PATENT DOCUMENTS 4,354,084 A * 10/1982 Husslein ............... F24C 15/006
126/21 A
5,738,081 A * 4/1998 Puricelli ................. F24C 14/02
126/21 A
(Continued)

FOREIGN PATENT DOCUMENTS

DE   102007015273 A1   10/2008
KR   10-2009-0021036 A   2/2009
KR   10-2010-0049785 A   5/2010

OTHER PUBLICATIONS

International Search Report dated Apr. 20, 2018 in connection with International Patent Application No. PCT/KR2018/000034.
(Continued)

*Primary Examiner* — Bayan Salone

(57) ABSTRACT

Disclosed herein is a cooking appliance having an improved cooling mechanism. The cooking appliance includes a first cavity forming a first cooking chamber and a second cavity forming a second cooking chamber, and has a cooling mechanism for cooling both the first cavity and the second cavity. A separate third cooling channel is formed to exhaust air from the first cooking chamber. A vent for the first and second cavities may be formed at a lower portion of the second cavity such that air may be exhausted via the vent.

20 Claims, 12 Drawing Sheets

(51) Int. Cl.
  *F24C 15/08*  (2006.01)
  *F24C 15/32*  (2006.01)
  *F24C 15/20*  (2006.01)
  *A21B 1/24*  (2006.01)
  *A21B 1/26*  (2006.01)
  *A21B 1/28*  (2006.01)
  *A47J 27/12*  (2006.01)
  *A47J 37/06*  (2006.01)
  *H05B 1/02*  (2006.01)
  *H05B 6/64*  (2006.01)

(52) U.S. Cl.
  CPC .......... *F24C 15/20* (2013.01); *F24C 15/2007* (2013.01); *F24C 15/2021* (2013.01); *H05B 1/0263* (2013.01)

(58) Field of Classification Search
  CPC ...... F24C 15/08; F24C 15/20; F24C 15/2007; F24C 15/2021; H05B 1/0263; H05B 6/64; A21B 1/24; A21B 1/26; A21B 1/28
  See application file for complete search history.

(56) References Cited

U.S. PATENT DOCUMENTS

| | | |
|---|---|---|
| 8,584,663 B2 | 11/2013 | Kim et al. |
| 8,707,945 B2 | 4/2014 | Hasslberger et al. |
| 2004/0079355 A1* | 4/2004 | Divett .................. F24C 15/006 126/21 R |
| 2005/0056634 A1 | 3/2005 | Shozo |
| 2008/0185373 A1 | 8/2008 | Elkasevic et al. |
| 2009/0050130 A1* | 2/2009 | Kim ...................... F24C 15/006 126/21 A |
| 2009/0183723 A1* | 7/2009 | Hasslberger ........ F24C 15/2007 126/21 A |
| 2010/0065036 A1 | 3/2010 | Watkins et al. |
| 2015/0241069 A1 | 8/2015 | Brant et al. |
| 2015/0369491 A1 | 12/2015 | Estrella et al. |

OTHER PUBLICATIONS

European Search Report dated May 22, 2018 in connection with European Patent Application No. EP 17 21 0795.
European Patent Office, "Communication under Rule 71(3) EPC," Application No. EP17210795.5, dated Mar. 1, 2019, 7 pages.

* cited by examiner

COOKING APPLIANCE

CROSS-REFERENCE TO RELATED APPLICATION

This application is related to and claims priority to Korean Patent Application No. 10-2017-0000965 filed on Jan. 3, 2017, the disclosure of which is incorporated herein by reference.

TECHNICAL FIELD

Embodiments of the present disclosure relate to a cooking appliance, and more particularly, to a cooking appliance having an improved cooling mechanism.

BACKGROUND

A cooking appliance is an appliance configured to cook food. There are various types of cooking appliances, e.g., an oven.

Generally, an oven is a food cooking appliance which includes a cooking chamber, a heating device configured to heat the cooking chamber, and a circulator configured to circulate heat generated by the heating device within the cooking chamber.

Ovens are appliances configured to cook food by heating the food in an airtight manner, and may be classified into an electric oven, a gas oven, and an electronic oven according to a heat source used. An electric oven uses an electric heater as a heat source, a gas oven uses a gas as a heat source, and a microwave oven uses frictional heat of water molecules caused by high-frequency waves.

Recently, built-in type cooking appliances have come into widespread used due to the various purposes of a kitchen space or to effectively use a kitchen area by being arranged to match kitchen furniture or be stored in the kitchen furniture.

A storage space is formed in previously installed furniture, and a built-in type cooking appliance is configured to be stored in the storage space of the furniture such that a user may use the cooking appliance while the cooking appliance is stored in the furniture.

SUMMARY

To address the above-discussed deficiencies, it is a primary object to provide a cooking appliance having an improved cooling mechanism.

It is another aspect of the present disclosure to provide a cooking appliance in which a whole cooling function thereof can be improved.

It is another aspect of the present disclosure to provide a cooking appliance having a cooling mechanism for increasing an internal capacity of the cooking chamber.

Additional aspects of the disclosure will be set forth in part in the description which follows and, in part, will be obvious from the description, or may be learned by practice of the disclosure.

In accordance with one aspect of the present disclosure, a cooking appliance includes a first cavity configured to form a first cooking chamber; a first fan configured to form a flow of air by causing air to flow outside the first cooking chamber; a second fan configured to form a flow of air by causing air to flow through an inside of the first cooking chamber; a first cover provided at an outer side of the first cavity; a first cooling channel formed between the first cavity and the first cover by the first fan; a second cavity stacked on the first cavity to form a second cooking chamber; a second cover provided at an outer side of the second cavity; a third fan configured to form a flow of air by causing air to flow outside and inside the second cooking chamber; a second cooling channel formed between the second cavity and the second cover by the third fan; a vent configured to discharge air from the first cooling channel and the second cooling channel; and a third cooling channel configured to guide air inside the first cooking chamber to the vent through the second cooling channel, the third cooling channel being isolated from the first cooling channel.

The cooking appliance may further include a guide member configured to form the third cooling channel.

The guide member may include a first connection pipe provided between the first cavity and the first cover; and a second connection pipe configured to guide air flowing from the first connection pipe to the second cooling channel.

The cooking appliance may further include a connection cover configured to form a connection channel connecting the first cooling channel and the second cooling channel.

The connection cover may include a first duct configured to form at least a portion of the third cooling channel.

The first connection pipe may connect the first cavity and the first duct.

The second connection pipe may connect the first duct and the second cooling channel.

The first cooling channel may include a first suction hole configured to cause an inflow of external air.

The second cooling channel may include a second suction hole configured to cause an inflow of external air.

The second suction hole may be located between the first cavity and the second cavity.

The vent may be formed at a lower portion of the second cavity.

In accordance with another aspect of the present disclosure, a cooking appliance includes a first cavity configured to form a first cooking chamber; a first cover provided at an outer side of the first cavity; a first cooling channel formed between the first cavity and the first cover; a first suction hole configured to cause external air to flow into the first cooling channel, the first suction hole being formed on the first cavity; a second cavity stacked on the first cavity to form a second cooking chamber; a second cover provided at an outer side of the second cavity; a second cooling channel formed between the second cavity and the second cover; a second suction hole configured to cause external air to flow into the second cooling channel, the second suction hole being formed on the second cavity; a vent configured to discharge air flowing into the first suction hole and the second suction hole, the vent being formed at a lower portion of the second cavity; and a third cooling channel configured to guide air inside the first cooking chamber to the vent, the third cooling channel being isolated from the first cooling channel.

The second suction hole may be located between the first cavity and the second cavity.

The first cavity may include a first fan configured to form a flow of air by causing air to flow outside the first cooking chamber; and a second fan configured to form a flow of air by causing air to flow through an inside of the first cooking chamber.

The second cavity may include a third fan configured to form a flow of air by causing air to flow outside and inside the second cooking chamber.

The cooking appliance may further include a guide member configured to form the third cooling channel.

The guide member may include a first connection pipe provided between the first cavity and the first cover; and a second connection pipe configured to guide air flowing from the first connection pipe to the second cooling channel.

The cooking appliance may further include a connection cover configured to form a connection channel connecting the first cooling channel and the second cooling channel. The connection cover may include a first duct configured to form at least a portion of the third cooling channel.

The first connection pipe may connect the first cavity and the first duct.

The second connection pipe may connect the first duct and the second cooling channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
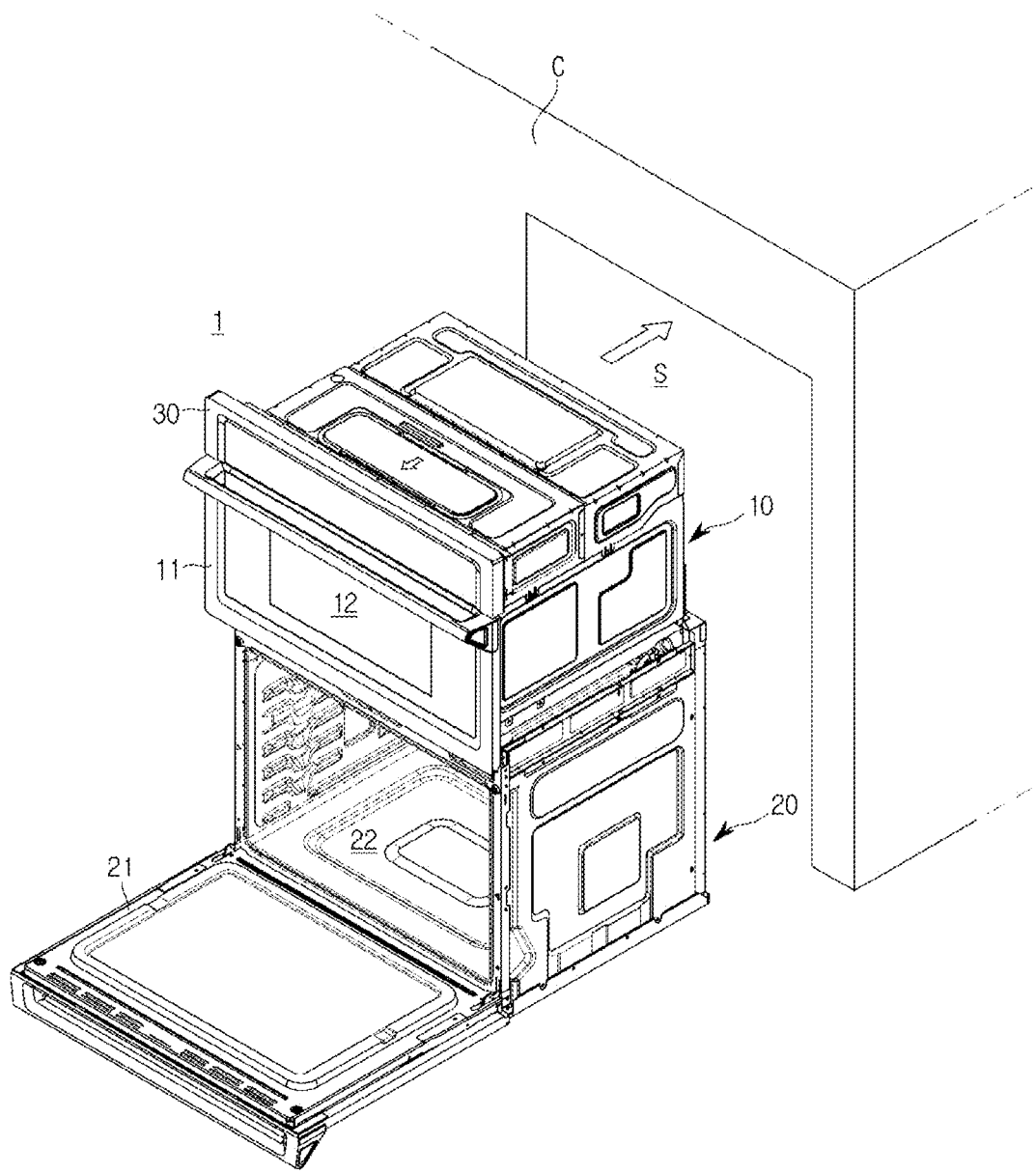
FIG. 1 is a perspective view of a cooking appliance in accordance with an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments set forth herein and structures illustrated in the drawings are merely examples of the present disclosure. Various modified examples which may replace these embodiments and the drawings could be made at the filing date of the present application.

In the drawings of the present disclosure, the same reference numerals or signs represent machine parts or components which perform substantially the same functions.

The terminology used herein is for the purpose of describing particular embodiments only and is not intended to limit the present disclosure. As used herein, the singular forms "a," "an," and "the" are intended to include the plural forms as well unless the context clearly indicates otherwise. It should be understood that the terms "comprise" and/or "comprising," when used herein, specify the presence of stated features, integers, steps, operations, elements, components, or a combination thereof, but do not preclude the presence or addition of one or more other features, integers, steps, operations, elements, components, or a combination thereof.

It should be understood that, although the terms "first," "second," and the like, may be used herein to describe various elements, the elements are not limited by these terms. These terms are only used to distinguish one element from another element. For example, a first element could be termed a second element without departing from the teachings of the present disclosure. Similarly, a second element could be termed a first element. As used herein, the term "and/or" includes any and all combinations of one or more of the associated listed items.

Hereinafter, embodiments of the present disclosure will be described in greater detail with reference to the accompanying drawings.

As used herein, the terms "front" and "ahead" refer to the front of a cooking appliance 1 illustrated in FIG. 1 and a forward direction with respect to the cooking appliance 1, and the term "rear" refers to a rearward direction with respect to the cooking appliance 1. Although a cooking appliance in accordance with an embodiment of the present disclosure will be described below as a built-in appliance installed in a display cupboard, embodiments are applicable to general cooking appliances.

Figure 2:
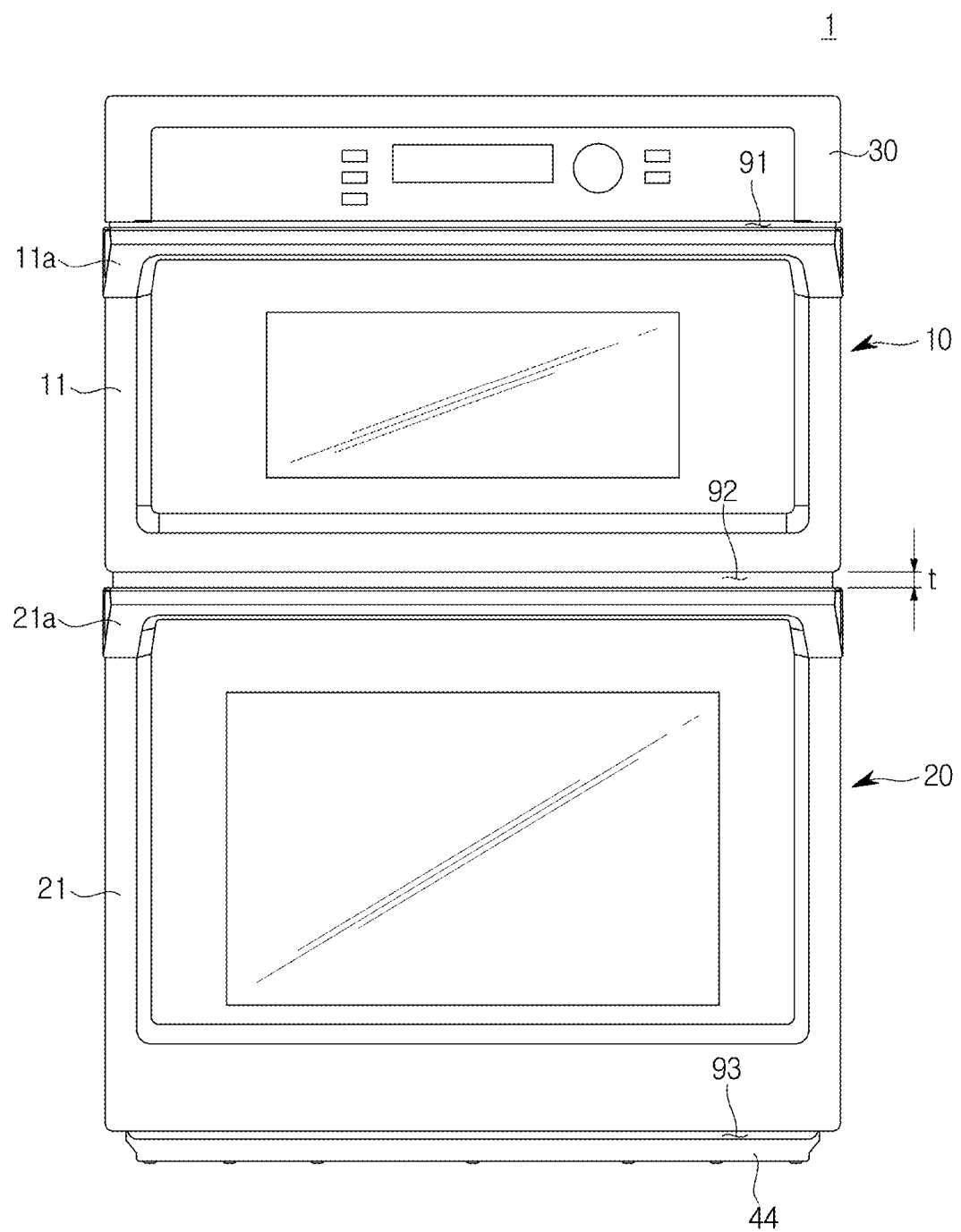
FIG. 2 is a top view of a cooking appliance in accordance with an embodiment of the present disclosure.
Figure 3:
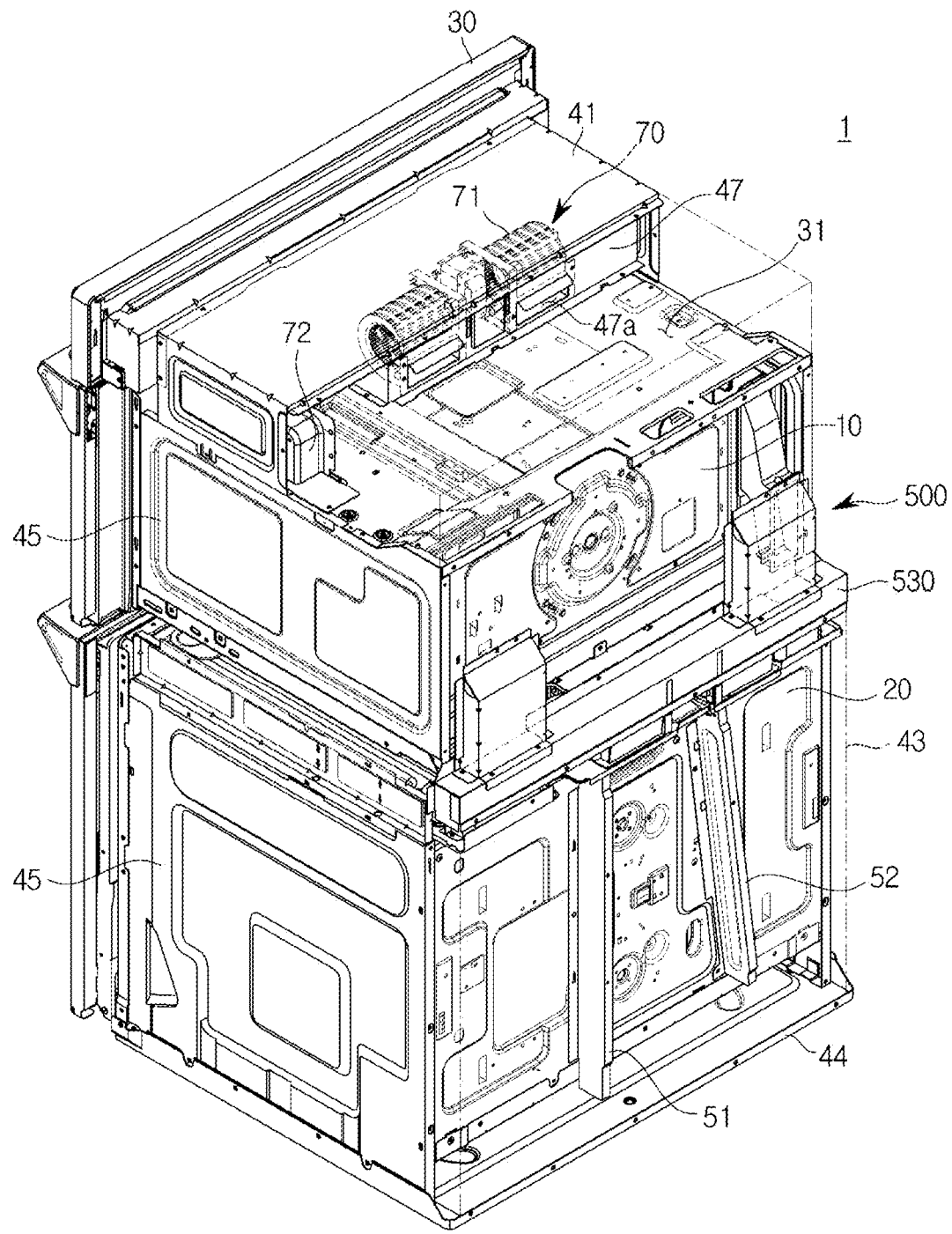
FIG. 3 is a partially cut-away perspective view of the rear of a cooking appliance in accordance with an embodiment of the present disclosure.
Figure 4:
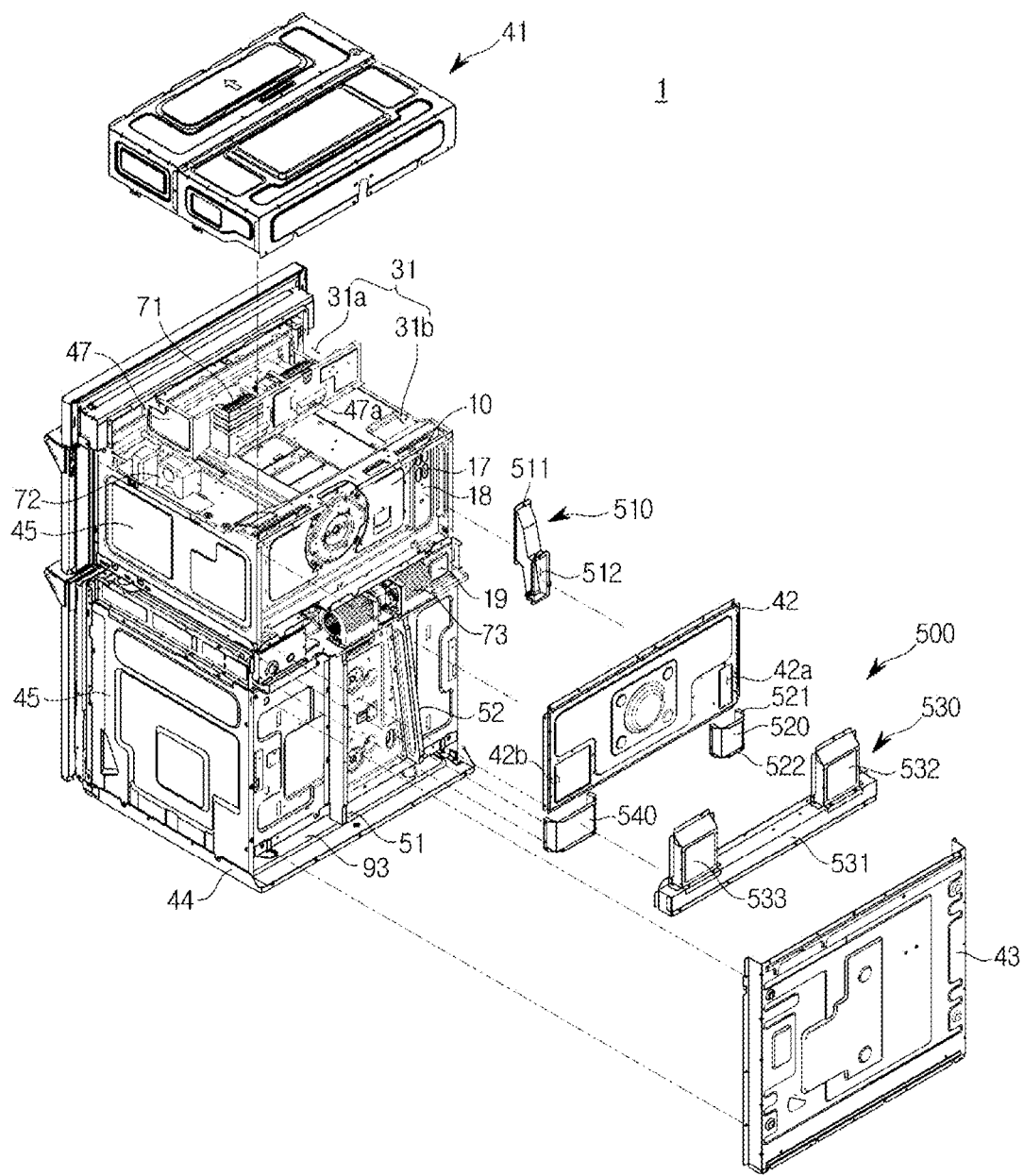
FIG. 4 is a partially cut-away exploded perspective view of a cooking appliance in accordance with an embodiment of the present disclosure.

FIG. 1 is a perspective view of a cooking appliance in accordance with an embodiment of the present disclosure. FIG. 2 is a top view of a cooking appliance in accordance with an embodiment of the present disclosure. FIG. 3 is a partially cut-away perspective view of the rear of a cooking appliance in accordance with an embodiment of the present disclosure. FIG. 4 is a partially cut-away exploded perspective view of a cooking appliance in accordance with an embodiment of the present disclosure.

As illustrated in FIGS. 1 to 4, a cooking appliance 1 may be installed inside furniture or a cabinet C to look unified with a kitchen space.

For example, an opening is formed in a front surface of the cabinet C in which the cooking appliance 1 is installed, and the cooking appliance 1 may be accommodated in an inner storage part S of the cabinet C via the opening.

The cooking appliance 1 may include a first cavity 10 and a second cavity 20 provided to cook food, and a control panel 30 on which various types of electrical components are installed.

The first cavity 10 and the second cavity 20 may be stacked vertically. Although the first cavity 10 is located on the second cavity 20 in an embodiment of the present disclosure, the arrangement of the first cavity 10 and the second cavity 20 is not limited thereto.

The first cavity 10 includes a first cooking chamber 12, and the second cavity 20 includes a second cooking chamber 22. A convection device (not shown) may be installed in each of the first cavity 10 and the second cavity 20. The convection device is provided to heat and circulate air in each of the first and second cooking chambers 12 and 22 to cook food in the first and second cooking chambers 12 and 22 separately from a heater (not shown). One convection device may be installed on a rear surface of each of the first and second cavities 10 and 20.

Each of the first cavity 10 and the second cavity 20 may be formed in a hexagonal shape having an open front surface. Doors 11 and 21 may be provided to selectively open or close the open front surfaces of the first cavity 10 and the second cavity 20. The doors 11 and 21 may include the first door 11 provided to open or close the first cavity 10, and the second door 21 provided to open or close the second cavity 20. Handles 11a and 21a may be provided on the doors 11 and 21 to be easily grasped by a user to open or close the doors 11 and 21.

In the first cavity 10 and the second cavity 20, suction holes may be formed on upper sides of the first door 11 and the second door 21 to perform cooling. In the first cavity 10, a first suction hole 91 may be formed in the upper side of the first door 11. In the second cavity 20, a second suction hole 92 may be formed in the upper side of the second door 21. The second suction hole 92 may be formed between the first door 11 and the second door 21.

Air flowing through the first suction hole 91 and the second suction hole 92 may be discharged via a vent 93, which will be described below. The vent 93 may be formed at a lower end of the second cavity 20.

Accordingly, only the second suction hole 92 may be provided between the first cavity 10 and the second cavity 20, and thus a distance between the first cavity 10 and the second cavity 20 may be minimized. A distance t between the first door 11 and the second door 21 may be 17 mm. The distance t between the first door 11 and the second door 21 may be in a range of 15 to 20 mm. The distance t between a lower end of the first door 11 and an upper end of the second door 21 may be 17 mm. A size of the second cooking chamber 22 of the second cavity 20 may be maximized by minimizing the distance t between the first door 11 and the second door 21.

The control panel 30 may be positioned at an upper front side of the first cavity 10 to receive an actuating signal for operating the first cavity 10 and the second cavity 20. The control panel 30 may be provided to display information regarding operations of the first cavity 10 and the second cavity 20. An electronic equipment chamber 31 in which a plurality of electronic components are installed may be provided at the rear of the control panel 30.

The first suction hole 91 may be formed between the control panel 30 and the first cavity 10 to suction external air. The first suction hole 91 may be formed at the front of the first cavity 10 between the control panel 30 and the first cavity 10. External air suctioned via the first suction hole 91 may cool the electronic components in the electronic equipment chamber 31.

Although not shown, a magnetron, which supplies high-frequency waves to the cavities 10 and 20, a high-pressure transformer forming a driving circuit driving the magnetron, a high-pressure condenser, a high-pressure diode, and the like may be installed in the electronic equipment chamber 31 of the first cavity 10 on which the control panel 30 is installed.

The electronic equipment chamber 31 may be provided on the first cavity 10. At least one fan 70 may be provided in the electronic equipment chamber 31. A first fan 71 and a second fan 72 may be provided in the electronic equipment chamber 31. The first fan 71 is provided to cool the various electronic components in the electronic equipment chamber 31 by suction external air. The second fan 72 may be provided to cause external air suctioned by the first fan 71 to flow into the first cooking chamber 12.

A third fan 73 may be provided at the rear of the cooking appliance 1 between the first cavity 10 and the second cavity 20. The third fan 73 is provided to be arranged between the first cavity 10 and the second cavity 20 and cool various electronic components installed in the second cavity 20 using external air suctioned via the second suction hole 92 formed in the front of the cooking appliance 1 between the first cavity 10 and the second cavity 20.

The electronic equipment chamber 31 may be divided by a partition 47. The electronic equipment chamber 31 may be divided by the partition 47 in a direction from the front to the rear. The electronic equipment chamber 31 may be divided into a first section 31a ahead of the partition 47, and a second section 31b behind the partition 47. The first fan 71 may be arranged in the first section 31a. The first fan 71 may be arranged in the first section 31a to suction external air via the first suction hole 91 in the front of the first cavity 10 and move the suctioned external air to the second section 31b. The electronic components in the electronic equipment chamber 31 may be arranged in the second section 31b. Thus, the suctioned external air may cool the electronic components in the second section 31b.

In the electronic equipment chamber 31, an air guide hole 47a may be formed in the partition 47 such that external air suctioned via the first suction hole 91 can move to the second section 31b. A plurality of air guide holes 47a may be formed. The plurality of air guide holes 47a may be formed in a lower side of the partition 47 such that external air flowing through the first fan 71 can move from the first section 31a to the second section 31b.

A plurality of covers may be provided at outer sides of the first cavity 10 and the second cavity 20 to form an appearance of the cooking appliance 1. The plurality of covers may include a top cover 41 configured to cover a top surface of the first cavity 10, a plurality of side covers 45 configured to cover opposite sides of the cavities 10 and 20, a base cover 44 configured to cover a bottom surface of the second cavity 20, and a first cover 42 and a second cover 43 configured to cover rear surfaces of the cavities 10 and 20. The top cover 41 provided to cover the electronic equipment chamber 31 may form a top surface of the cooking appliance 1.

A plurality of cooling channels 100 and 200 may be formed in the first cavity 10 and between the first cavity 10, the first cover 42, and the second cover 43. The cooling channels 100 and 200 may be formed in spaces between the cavities 10 and 20 and the covers 42 and 43. The cooling channels 100 and 200 may include a first cooling channel 100 formed between the first cavity 10 and the first cover 42, a second cooling channel 200 formed between the second cavity 20 and the second cover 43, a connection channel 400 connecting the first cooling channel 100 and the second cooling channel 200, and a third cooling channel 300 formed in the first cavity to be isolated from the first cooling channel 100.

External air flowing through the first suction hole 91 is discharged through the first cooling channel 100, which is provided to cool the electronic equipment chamber 31 in the first cavity 10 and the first cavity 10, via the vent 93 by the first fan 71.

In this case, the first cooling channel 100 may be formed using the first fan 71 may form a flow of air such that the air circulates outside the first cooking chamber 12 of the first cavity 10.

The second cooling channel 200 formed between the second cavity 20 and the second cover 43 may be formed such that air circulating through the inside of the second cooking chamber 22 of the second cavity 20 is discharged to the outside after food is cooked while various electronic components in the second cavity 20 are cooled by external air flowing into the second suction hole 92 via the third fan 73. The second cooling channel 200 may be formed using the third fan 73 may form a flow of air such that the air circulates through the inside of the second cooking chamber 22 of the second cavity 20.

The first cooling channel 100 and the second cooling channel 200 may be connected. The first cooling channel 100 and the second cooling channel 200 may be connected via the connection channel 400. The connection channel 400 may be formed by a connection cover 530. The connection cover 530 may be formed between the first cover 42 and the second cover 43 to connect the first cavity 10 and the second cavity 20. The connection cover 530 is provided to connect the first cover 42 and the second cover 43.

The connection cover 530 may include a connection cover body 531, and a first duct 532 and a second duct 533 installed at the connection cover body 531. At least a part of the connection cover 530 may include the third cooling channel 300. The first duct 532 of the connection cover 530 may form the third cooling channel 300.

At least a part of external air flowing through the first suction hole 91 is moved into the first cavity 10 by the second fan 72. The second fan 72 may be arranged in the second section 31b of the electronic equipment chamber 31. The second fan 72 may form a flow of air such that the air circulates through the inside of the first cooking chamber 12 of the first cavity 10. A first cavity hole 17 may be formed in at least a part of the first cooking chamber 12 so that air may be discharged from the inside of the first cooking chamber 12 via the second fan 72 after food is cooked. Although the first cavity hole 17 is formed in a side of a rear surface of the first cooking chamber 12 in an embodiment of the present disclosure, the scope of the present disclosure is not limited thereto. For example, the first cavity hole 17 may be formed in at least one among a top surface and side surfaces of the first cavity 10.

The third cooling channel 300 may be formed in the first cavity hole 17 of the first cavity 10 to be isolated from the first cooling channel 100. The third cooling channel 300 may be connected to the first cavity hole 17. The third cooling channel 300 may be formed to be connected to the second cooling channel 200. The third cooling channel 300 may be formed behind the first cavity 10 to be separated from the first cooling channel 100. The third cooling channel 300 may be formed in at least a part of the connection channel 400.

The third cooling channel 300 may be formed by a guide member 500. One side of the guide member 500 may be connected to the first cavity hole 17, and the other side thereof may be connected to the second cooling channel 200.

Thus, the guide member 500 may be provided to guide air flowing inside the first cooking chamber 12 of the first cavity 10 to the vent 93 through the second cooling channel 200.

Figure 5:
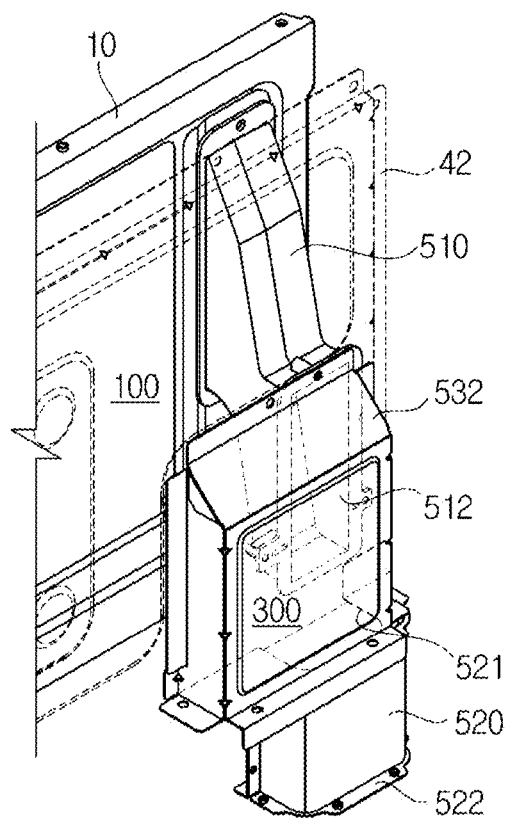
FIG. 5 is a perspective view of a guide member forming a cooling channel of a cooking appliance in accordance with an embodiment of the present disclosure.
Figure 6:
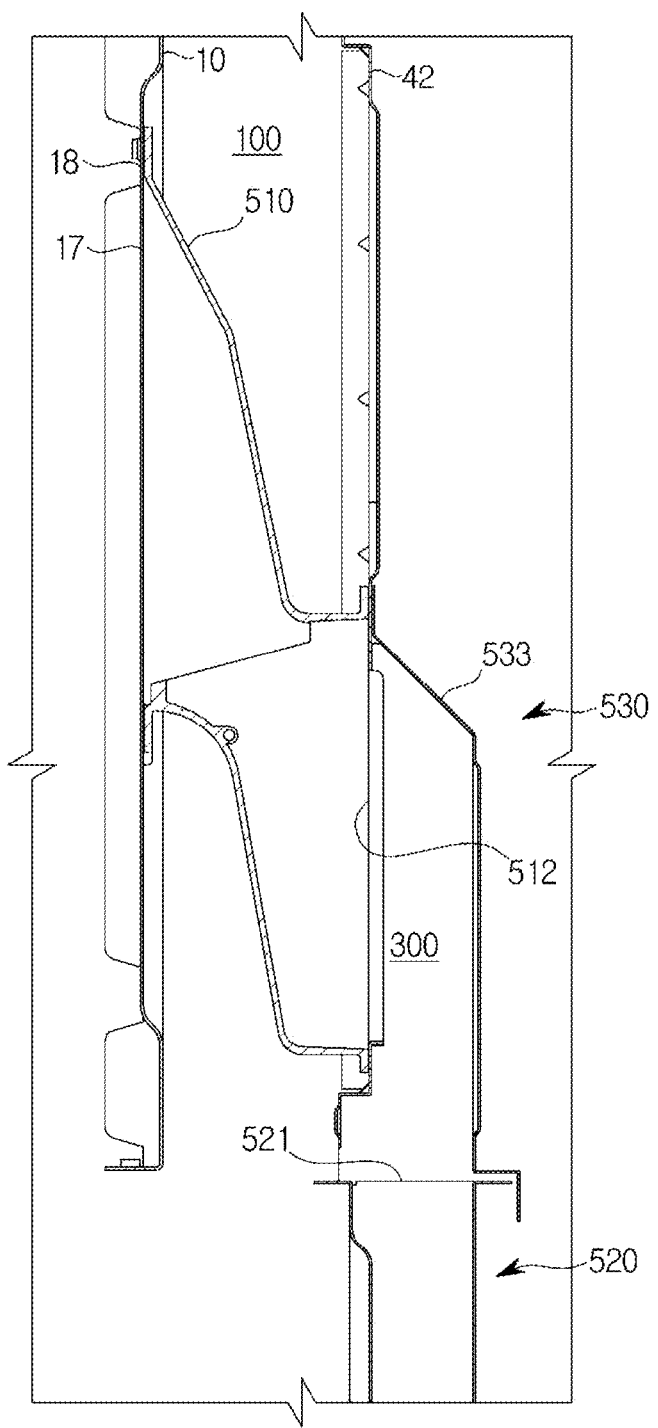
FIG. 6 is a partial cross-sectional view of a guide member forming a cooling channel of a cooking appliance in accordance with an embodiment of the present disclosure.
Figure 7:
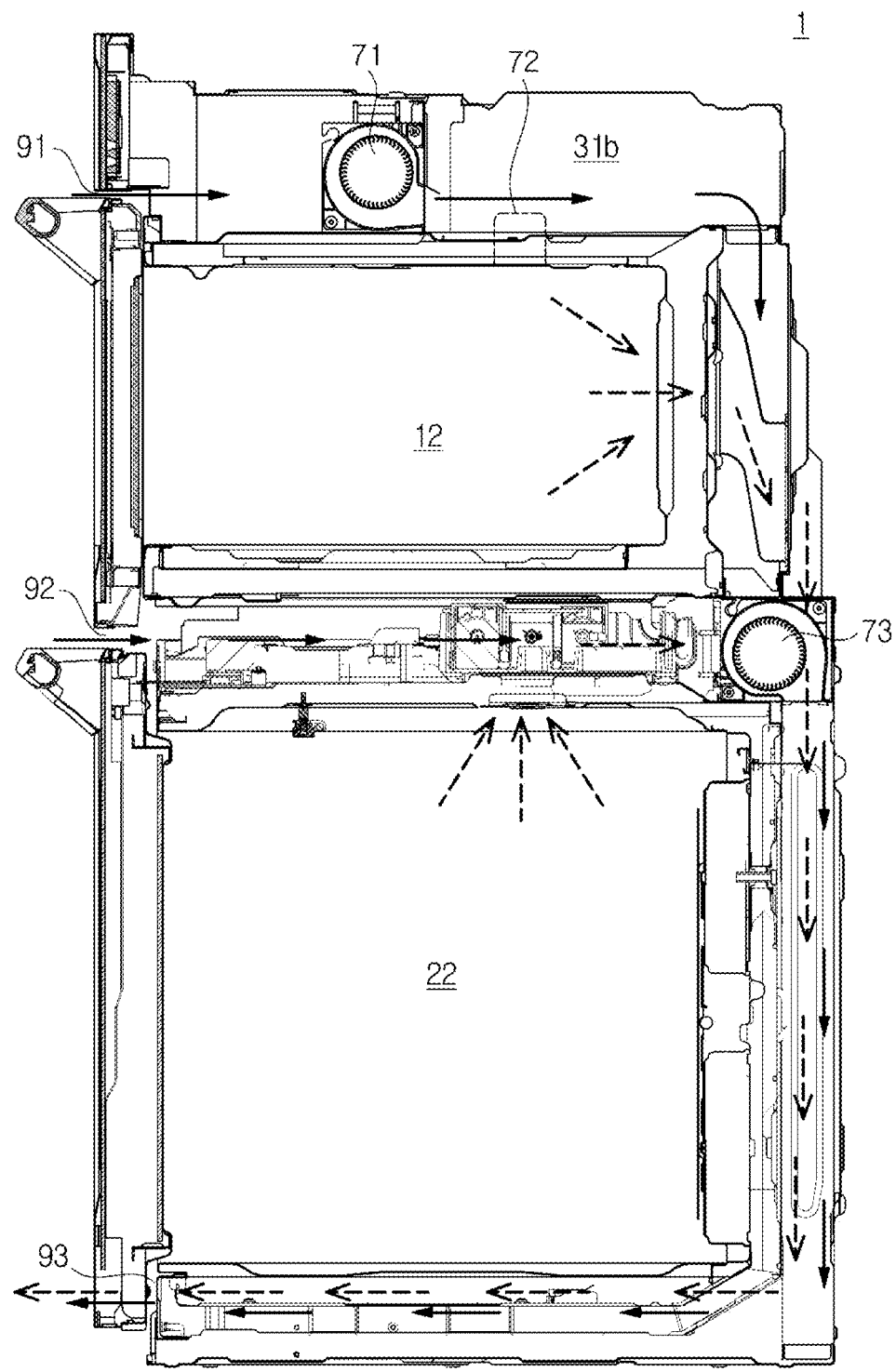
FIG. 7 is a cross-sectional view illustrating a flow of air when a cooking appliance in accordance with an embodiment of the present disclosure is driven.
Figure 8:
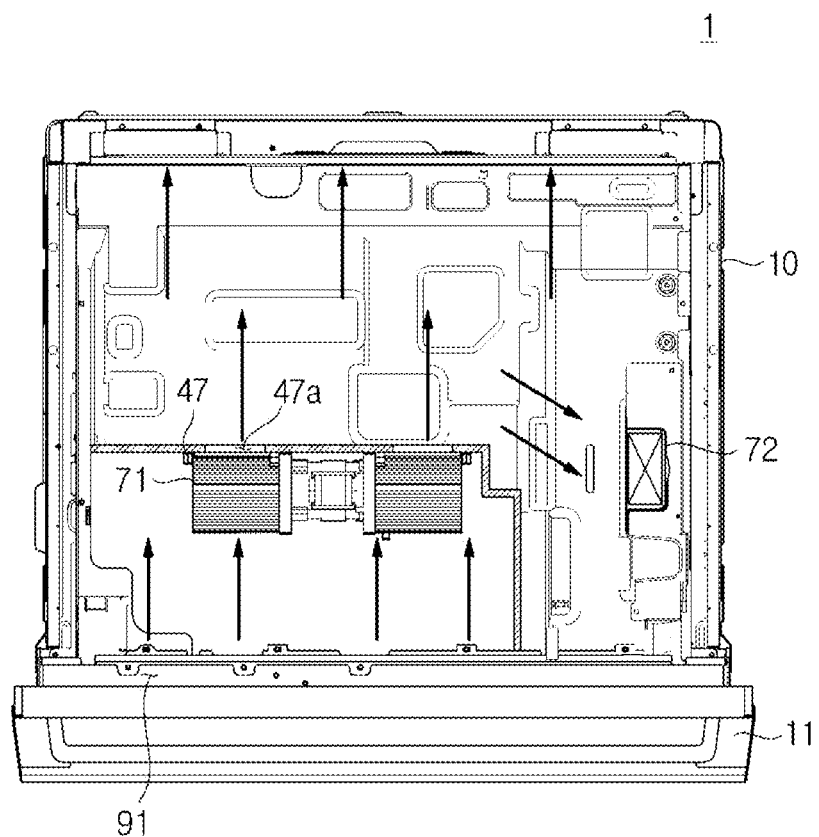
FIG. 8 is a diagram illustrating a flow of air for cooling a first cavity in accordance with an embodiment of the present disclosure.
Figure 9:
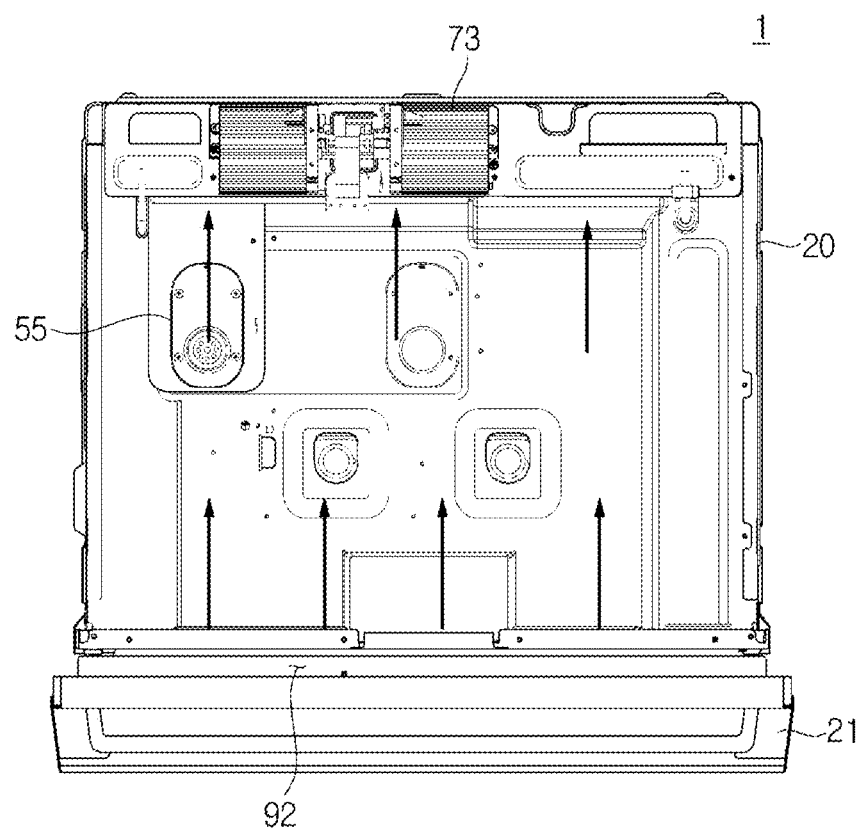
FIG. 9 is a diagram illustrating a flow of air for cooling a second cavity in accordance with an embodiment of the present disclosure.
Figure 10:
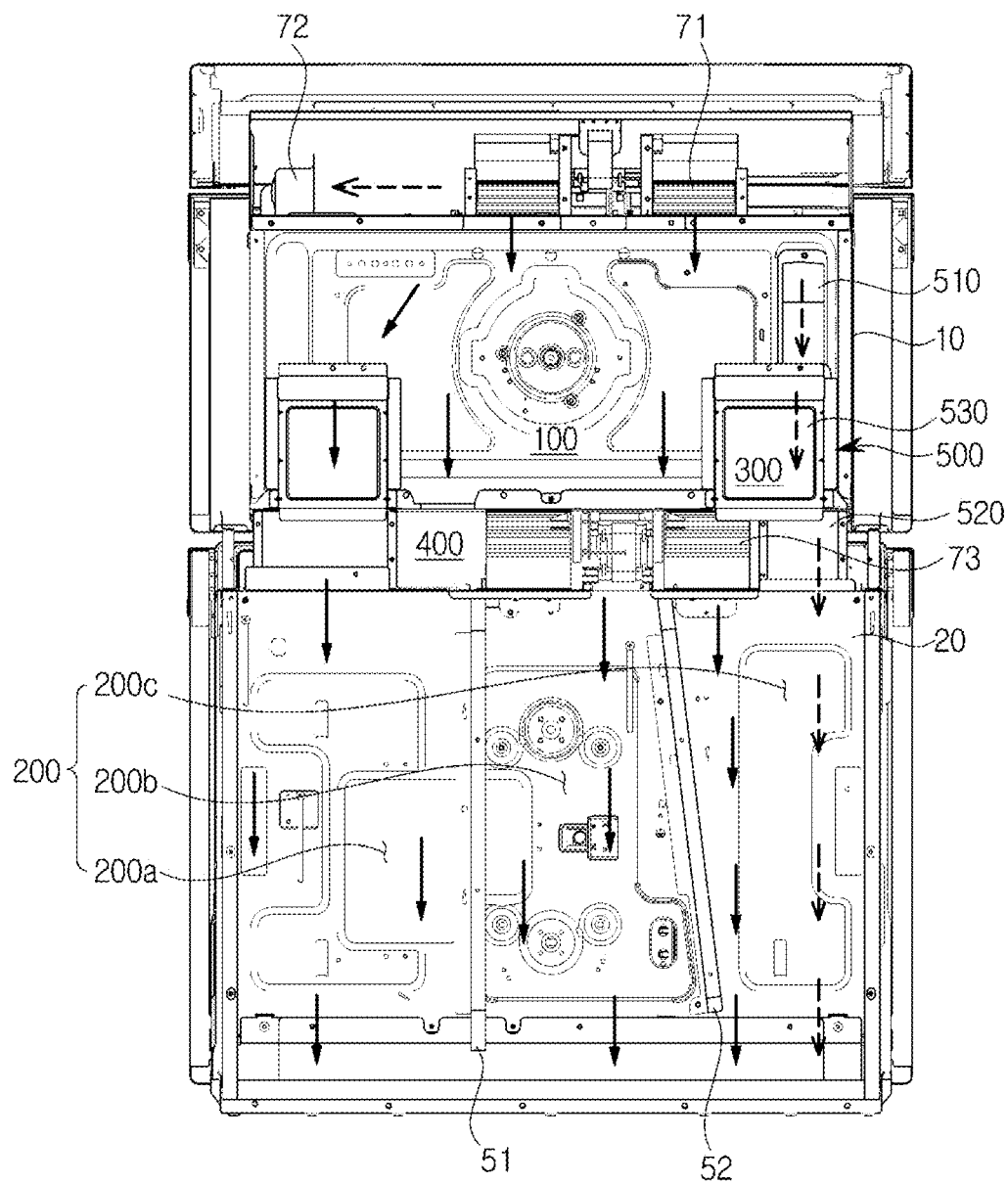
FIG. 10 is a diagram illustrating a flow of air when a cooking appliance in accordance with an embodiment of the present disclosure is driven.

FIG. 5 is a perspective view of a guide member forming a cooling channel of a cooking appliance in accordance with an embodiment of the present disclosure. FIG. 6 is a partial cross-sectional view of a guide member forming a cooling channel of a cooking appliance in accordance with an embodiment of the present disclosure. FIG. 7 is a cross-sectional view illustrating a flow of air when a cooking appliance in accordance with an embodiment of the present disclosure is driven. FIG. 8 is a diagram illustrating a flow of air for cooling a first cavity in accordance with an embodiment of the present disclosure. FIG. 9 is a diagram illustrating a flow of air for cooling a second cavity in accordance with an embodiment of the present disclosure. FIG. 10 is a diagram illustrating a flow of air when a cooking appliance in accordance with an embodiment of the present disclosure is driven As illustrated in FIGS. 5 to 10, the guide member 500 may include a first connection pipe 510, a second connection pipe 520, and a portion of the connection cover 530.

The guide member 500 includes the first connection pipe 510 provided between the first cavity 10 and the first cover 42. The guide member 500 includes the second connection pipe 520 to guide air flowing through the first connection pipe 510 to the second cooling channel 200. The guide member 500 may include the first duct 532 of the connection cover 530 which connects the first connection pipe 510 and the second connection pipe 520.

The connection cover 530 may include the connection cover body 531, and the first duct 532 and the second duct 533 formed at the connection cover body 531. The connection cover body 531 may be provided to connect the first cover 42 and the second cover 43. The connection cover 530 is provided to cover an outer side of the third fan 73. The first duct 532 and the second duct 533 extending from the connection cover body 531 may be connected to the first cover 42. The first duct 532 is provided to connect the third cooling channel 300 and the second cooling channel 200. The second duct 533 is provided to connect the first cooling channel 100 and the second cooling channel 200.

A first connection pipe installation part 18 for installing the first connection pipe 510 may be formed at the first cavity 10. The first connection pipe installation part 18 may be formed near the first cavity hole 17 of the first cavity 10.

The first connection pipe 510 of the guide member 500 is formed in a hollow tubular shape. The first connection pipe 510 includes a first connection part 511 having one end connected to the first cavity hole 17, and a second connection part 512 having one end connected to a first cover hole 42a of the first cover 42.

The second connection part 512 of the guide member 500 may be connected to the first duct 532 of the connection cover 530.

The first cover hole 42a having a shape corresponding to that of the second connection part 512 of the first connection pipe 510 may be formed at the first cover 42. The first cover hole 42a may be formed to be covered by the first duct 532 of the connection cover 530.

The first duct 532 of the connection cover 530 is formed to cover the first cover hole 42a so that air supplied thereto through the first connection pipe 510 may pass through the first duct 532 and then be moved to the second cooling channel 200.

The second connection pipe 520 is arranged between the first cover 42 and the second cover 43. The second connection pipe 520 may be installed at a second connection pipe installation part 19 between the first cover 42 and the second cover 43.

The second connection pipe 520 may be formed in a roughly "⊏" shape. An open surface of the second connection pipe 520 may be covered by the second connection pipe installation part 19. The second connection pipe 520 may include a first opening 521 and a second opening 522. The first opening 521 may be formed in an upper end of the second connection pipe 520. The second opening 522 may be formed in a lower end of the second connection pipe 520. The second connection pipe 520 is provided to be covered by the connection cover body 531 of the connection cover 530. The second connection pipe 520 is configured such that air from the first duct 532 flows through the first opening 521 and is discharged via the second opening 522.

In this case, the second opening 522 of the second connection pipe 520 is connected to the second cooling channel 200, and the air discharged via the second opening 522 is discharged to the vent 93 via the second cooling channel 200.

Thus, air inside the first cooking chamber 12 of the first cavity 10 which contains impurities such as oil due to food being cooked may be discharged to the first cavity hole 17, may pass through the first connection pipe 510 of the guide member 500 connected to the first cavity hole 17 and the first duct 532 of the connection cover 530, and may then be moved to the second cooling channel 200 through the second connection pipe 520.

In this case, the air inside the first cooking chamber 12 is discharged to the vent 93 through a third portion 200c, which is an end of a side of the second cooling channel 200.

At least one partition 47 may be provided at the second cooling channel 200. The at least one partition 47 may be provided between a rear surface of the second cavity 20 and the second cover 43. The at least one partition 47 may be arranged in a height direction of the second cavity 20. The at least one partition 47 may include a first partition 51 and a second partition 52 spaced a predetermined distance away from the first partition 51. The first partition 51 and the second partition 52 may be arranged at a bottom of the third fan 73.

Thus, the second cooling channel 200 may be divided into three spaces by at least two partitions 47. The second cooling channel 200 may include a first portion 200a, a second portion 200b, and the third portion 200c.

Air flowing outside the first cavity 10 into the first cooling channel 100 by the first fan 71 may be moved to the first portion 200a, the second portion 200b, and the third portion 200c of the second cooling channel 200 through the connection channel 400 and may then be discharged via the vent 93.

In this case, the air inside the first cooling channel 100 is moved to the second cooling channel 200 by being guided to a third connection member 540 by the second duct 533 covering a first cover outlet hole 42b of the first cover 42.

The air guided to the second cooling channel 200 by the second duct 533 is discharged to the vent 93 via the first portion 200a.

The first cover outlet hole 42b of the first cover 42 may be formed in a shape corresponding to that of the second duct 533.

Air flowing through the inside of the first cavity 10 into the third cooling channel 300 by the second fan 72 may be moved to the third portion 200c of the second cooling channel 200 through the first connection pipe 510 and the second connection pipe 520 of the guide member 500 and may then be discharged via the vent 93 (as indicated by a broken line arrow of FIG. 10).

Air flowing outside the second cavity 20 into the second cooling channel 200 by the third fan 73 may be discharged to the vent 93 through the second portion 200b. In this case, air flowing through the inside of the second cavity 20 by the third fan 73 may be moved to the third portion 200c of the second cooling channel 200 and discharged via the vent 93. In this case, an air guide 55 configured to guide the air inside the second cavity 20 may be formed at an upper portion of the second cavity 20.

In the cooking appliance 1, the first cooling channel 100 and the third cooling channel 300 configured to cool the first cavity 10 and the second cooling channel 200 configured to cool the second cavity 20 are connected by the connection channel 400, and air inside the first to third cooling channels 100 to 300 is discharged via the vent 93 of the second cooling channel 200.

That is, air suctioned via the first suction hole 91 of the first cooling channel 100 cools the first cavity 10 and air suctioned via the second suction hole 92 of the second cooling channel 200 cools the second cavity 20, and the air is then discharged via the vent 93 of the second cooling channel 200.

Thus, the first cooling channel 100 and the second cooling channel 200 are simultaneously operated. The first fan 71, the second fan 72, and the third fan 73 may be simultaneously operated. When the first cavity 10 and the second cavity 20 of the cooking appliance 1 are driven, the first cavity 10 and the second cavity 20 may be simultaneously cooled by the first fan 71, the second fan 72, and the third fan 73. However, even when the first cooking chamber 12 of first cavity 10 and the second cooking chamber 22 of the second cavity 20 are individually driven, the first fan 71, the second fan 72, and the third fan 73 may be simultaneously operated to cool the first and second cooking chambers 12 and 22.

Figure 11:
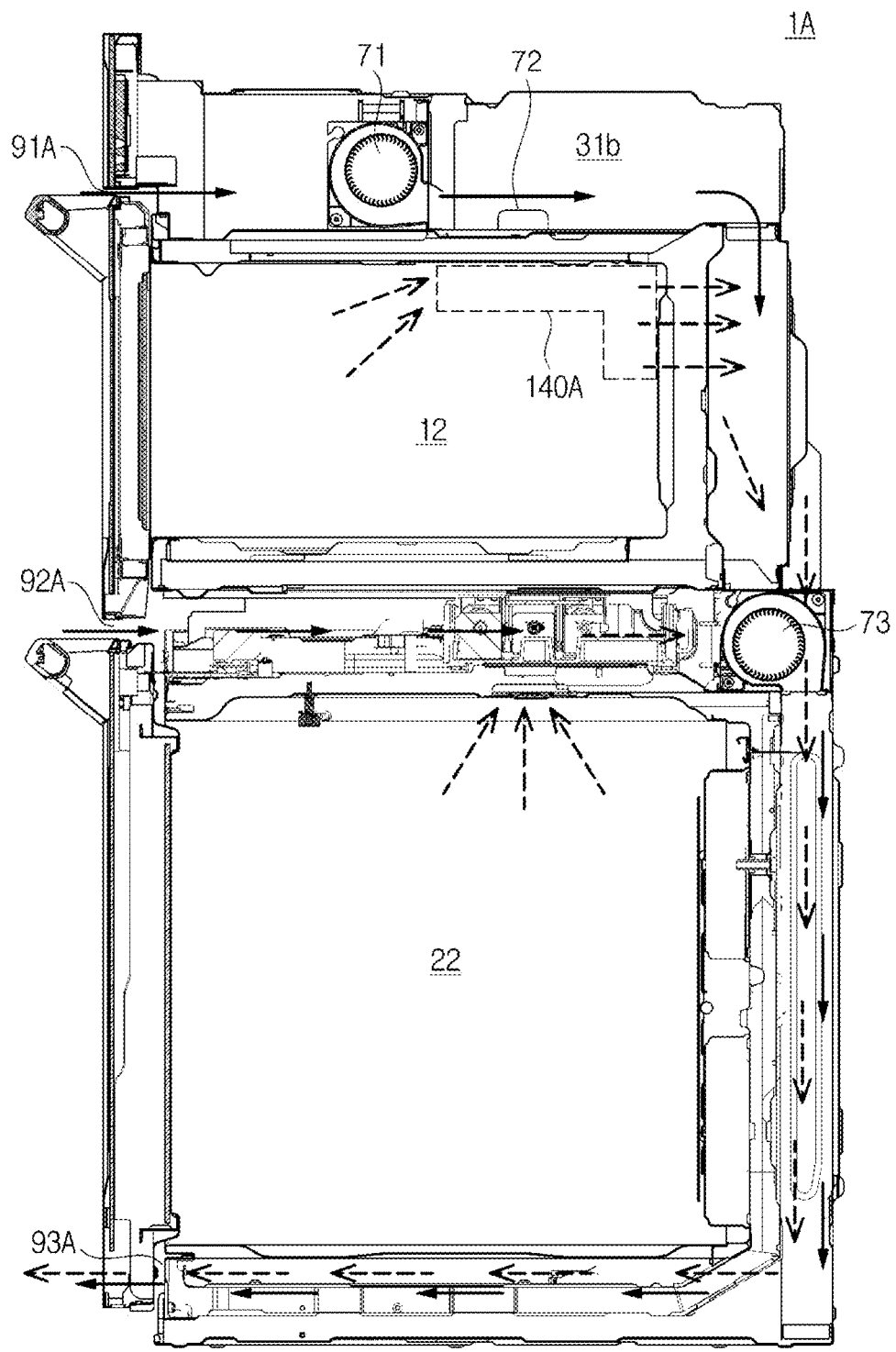
FIG. 11 is a diagram schematically illustrating a cooling channel of a cooking appliance in accordance with another embodiment of the present disclosure.
Figure 12:
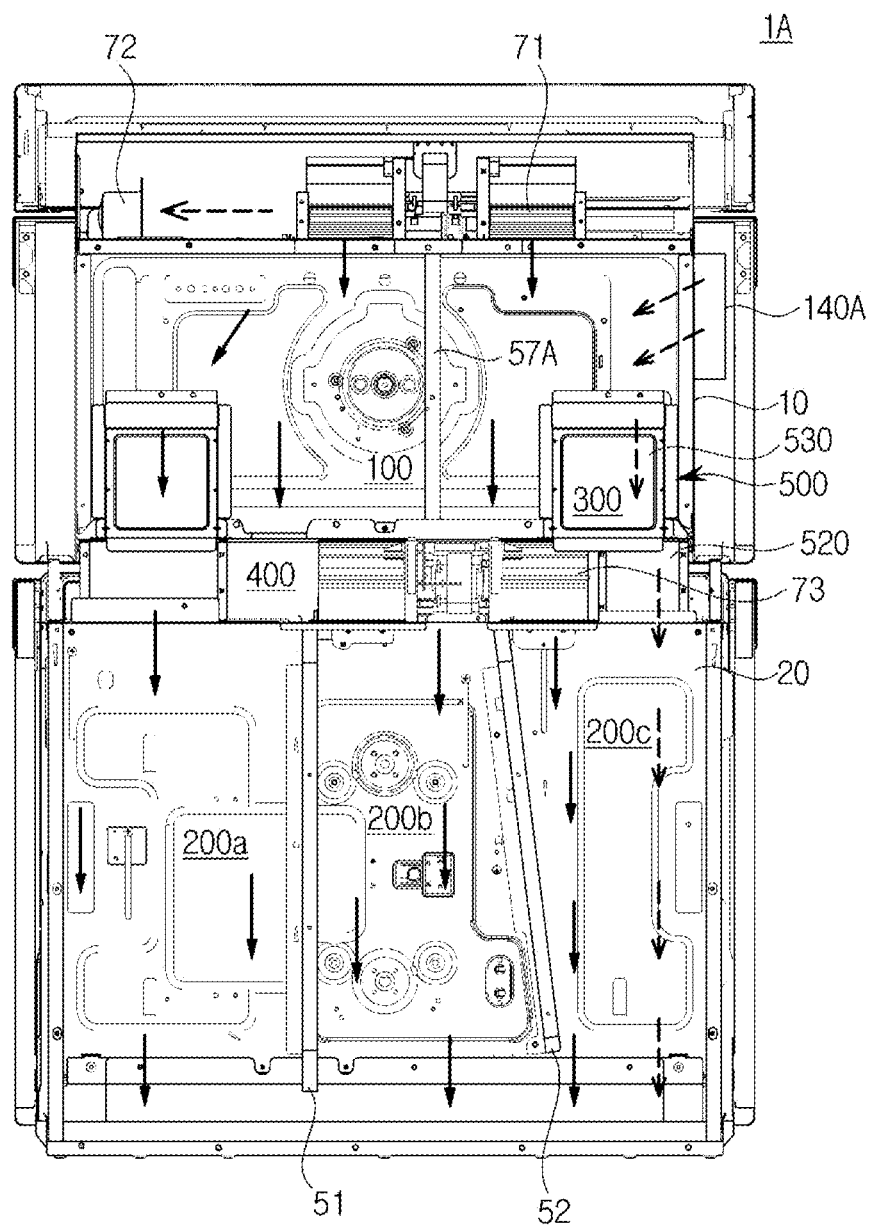
FIG. 12 is a diagram illustrating a flow of air when a cooling appliance in accordance with another embodiment of the present disclosure is driven.

FIG. 11 is a diagram schematically illustrating a cooling channel of a cooking appliance in accordance with another embodiment of the present disclosure. FIG. 12 is a diagram illustrating a flow of air when a cooking appliance in accordance with another embodiment of the present disclosure is driven. For reference numerals not shown can be understood with reference to FIGS. 1 and 10.

As illustrated in FIGS. 11 and 12, a cooking appliance 1A may include a plurality of cooling channels 100, 200, 300, and 400.

The first cooling channel 100 may be formed between a first cavity 10 and a first cover 42, the second cooling channel 200 may be formed between a second cavity 20 and a second cover 43, and the first cooling channel 100 and the second cooling channel 200 may be connected through connection channel 400. The third cooling channel 300 may be connected to the first cavity 10 to be isolated from the first cooling channel 100.

The first cooling channel 100 is provided such that air flowing through a first suction hole 91A is discharged to the outside via a vent 93A of the second cooling channel 200.

The second cooling channel 200 is provided such that air flowing through a second suction hole 92A is discharged to the outside via the vent 93A of the second cooling channel 200.

The third cooling channel 300 is provided to be connected to the inside of the first cavity 10. The third cooling channel 300 is provided such that air inside the first cavity 10 flows thereto through a guide member 140A after food is cooked. The guide member 140A may be connected to a side surface of the first cavity 10 and extend to the rear surface of cooking appliance 1A. Although the guide member 140A is illustrated as a pipe having a "¬" shape in an embodiment of the present disclosure, the present disclosure is not limited thereto. For example, the guide member 140A may include a duct or a tube.

One side of the guide member 140A may be connected to the first cavity 10, and another side thereof may be located behind the first cavity 10. Air discharged from the first cavity 10 through the guide member 140A after food is cooked flows into the second cooling channel 200 via the third cooling channel 300, and is then discharged via the vent 93A of the second cooling channel 200.

The third cooling channel 300 may be isolated from the first cooling channel 100 by a partition wall 57A dividing at least a part of the first cooling channel 100. Air may be moved to the vent 93A of the second cooling channel 200 through the third cooling channel 300 isolated from the first cooling channel 100 by the partition wall 57A after food is cooked and may then be discharged to the outside.

The guide member 140A forming the third cooling channel 300 may include a first duct 532 of a connection cover 530 and a second connection pipe 520.

A structure and operations of the cooking appliance 1A having the third cooling channel 300 configured as described above should be apparent from the above description, and are thus not described again here.

As is apparent from the above description, in accordance with an embodiment of the present disclosure, a whole cooling function of a cooking appliance can be improved due to an improved cooling mechanism thereof.

Furthermore, an inner capacity and appearance of the cooking chamber can be improved.

Although a few embodiments of the present disclosure have been shown and described, it should be appreciated by those skilled in the art that changes may be made in these embodiments without departing from the principles and spirit of the disclosure, the scope of which is defined in the claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A cooking appliance comprising:
a first cavity configured to form a first cooking chamber;
a first fan configured to form a flow of air to flow outside the first cooking chamber;
a second fan configured to form a flow of air to flow through an inside of the first cooking chamber;
a first cover provided at an outer side of the first cavity;
a first cooling channel formed between the first cavity and the first cover by the first fan;
a second cavity stacked on the first cavity to form a second cooking chamber;
a second cover provided at an outer side of the second cavity;
a third fan configured to form a flow of air to flow outside and inside the second cooking chamber;
a second cooling channel formed between the second cavity and the second cover by the third fan;
a vent configured to discharge air from the first cooling channel and the second cooling channel; and
a third cooling channel configured to guide air inside the first cooking chamber to the vent through the second cooling channel, the third cooling channel being isolated from the first cooling channel.

2. The cooking appliance according to claim 1, further comprising a guide member configured to form the third cooling channel.

3. The cooking appliance according to claim 2, wherein the guide member comprises:
a first connection pipe provided between the first cavity and the first cover; and
a second connection pipe configured to guide air flowing from the first connection pipe to the second cooling channel.

4. The cooking appliance according to claim 3, further comprising a connection cover configured to form a connection channel connecting the first cooling channel and the second cooling channel.

5. The cooking appliance according to claim 4, wherein the connection cover comprises a first duct configured to form at least a portion of the third cooling channel.

6. The cooking appliance according to claim 5, wherein the first connection pipe connects the first cavity and the first duct.

7. The cooking appliance according to claim 5, wherein the second connection pipe connects the first duct and the second cooling channel.

8. The cooking appliance according to claim 1, wherein the first cooling channel comprises a first suction hole configured to cause an inflow of external air.

9. The cooking appliance according to claim 1, wherein the second cooling channel comprises a second suction hole configured to cause an inflow of external air.

10. The cooking appliance according to claim 9, wherein the second suction hole is located between the first cavity and the second cavity.

11. The cooking appliance according to claim 1, wherein the vent is formed at a lower portion of the second cavity.

12. A cooking appliance comprising:
a first cavity configured to form a first cooking chamber;
a first cover provided at an outer side of the first cavity;
a first cooling channel formed between the first cavity and the first cover;
a first suction hole configured to cause external air to flow into the first cooling channel, the first suction hole being formed on the first cavity;
a second cavity stacked on the first cavity to form a second cooking chamber;
a second cover provided at an outer side of the second cavity;
a second cooling channel formed between the second cavity and the second cover;
a second suction hole configured to cause external air to flow into the second cooling channel, the second suction hole being formed on the second cavity;

a vent configured to discharge air flowing into the first suction hole and the second suction hole, the vent being formed at a lower portion of the second cavity; and a third cooling channel configured to guide air inside the first cooking chamber to the vent, the third cooling channel being isolated from the first cooling channel.

13. The cooking appliance according to claim 12, wherein the second suction hole is located between the first cavity and the second cavity.

14. The cooking appliance according to claim 12, wherein the first cavity comprises:

a first fan configured to form a flow of air to flow outside the first cooking chamber; and a second fan configured to form a flow of air to flow through an inside of the first cooking chamber.

15. The cooking appliance according to claim 12, wherein the second cavity comprises a third fan configured to form a flow of air to flow outside and inside the second cooking chamber.

16. The cooking appliance according to claim 12, further comprising a guide member configured to form the third cooling channel.

17. The cooking appliance according to claim 16, wherein the guide member comprises:

a first connection pipe provided between the first cavity and a first cover; and a second connection pipe configured to guide air flowing from the first connection pipe to the second cooling channel.

18. The cooking appliance according to claim 17, further comprising a connection cover configured to form a connection channel connecting the first cooling channel and the second cooling channel, wherein the connection cover comprises a first duct configured to form at least a portion of the third cooling channel.

19. The cooking appliance according to claim 18, wherein the first connection pipe connects the first cavity and the first duct.

20. The cooking appliance according to claim 18, wherein the second connection pipe connects the first duct and the second cooling channel.

\* \* \* \* \*